Sept. 7, 1965     J. B. O'MALEY     3,205,489
DIGITAL CONVERTER

Filed July 17, 1961     4 Sheets-Sheet 1

INVENTOR.
JAMES B. O'MALEY

BY Leonard H. King
ATTORNEY.

Sept. 7, 1965 J. B. O'MALEY 3,205,489
DIGITAL CONVERTER
Filed July 17, 1961 4 Sheets-Sheet 2
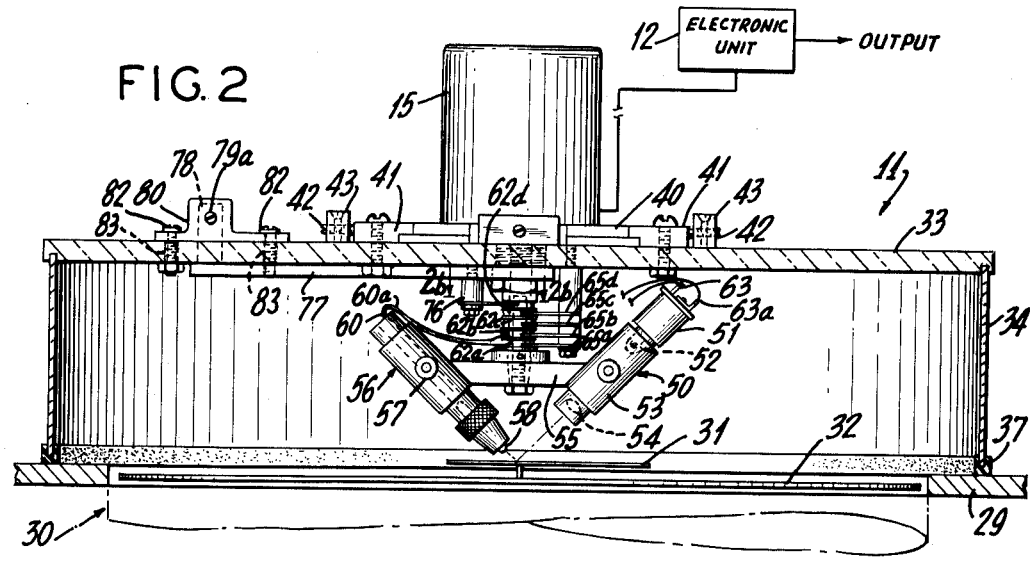
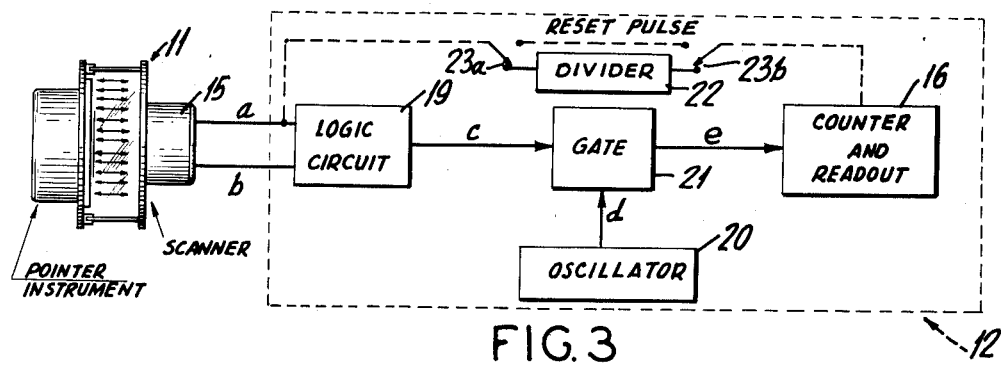
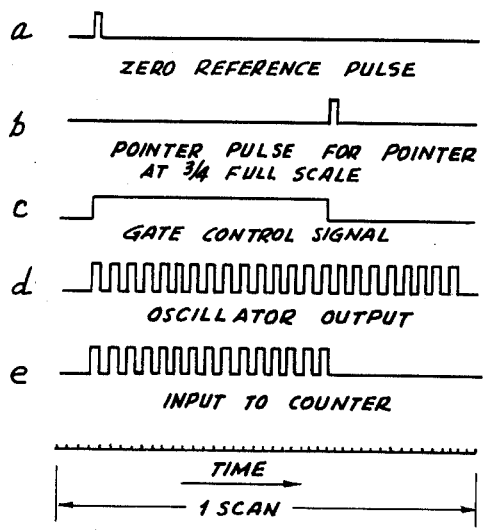
INVENTOR.
JAMES B. O'MALEY
BY
Leonard H. King
ATTORNEY.

Sept. 7, 1965 J. B. O'MALEY 3,205,489
DIGITAL CONVERTER
Filed July 17, 1961 4 Sheets-Sheet 3

INVENTOR.
JAMES B. O'MALEY
BY
Leonard H. King
ATTORNEY.

Sept. 7, 1965 J. B. O'MALEY 3,205,489
DIGITAL CONVERTER
Filed July 17, 1961 4 Sheets-Sheet 4
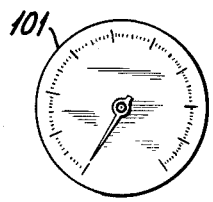
FIG.10
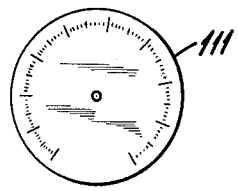
FIG.11
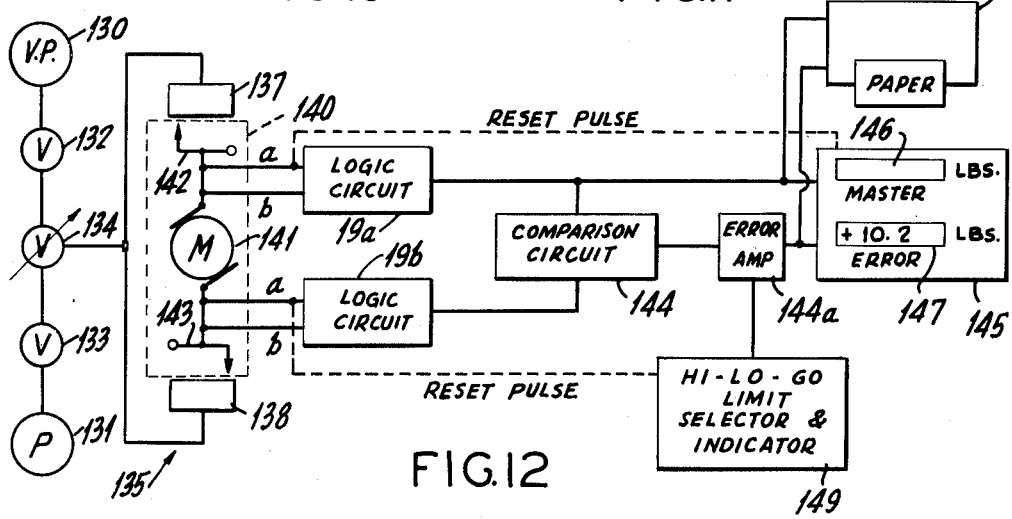
FIG.12
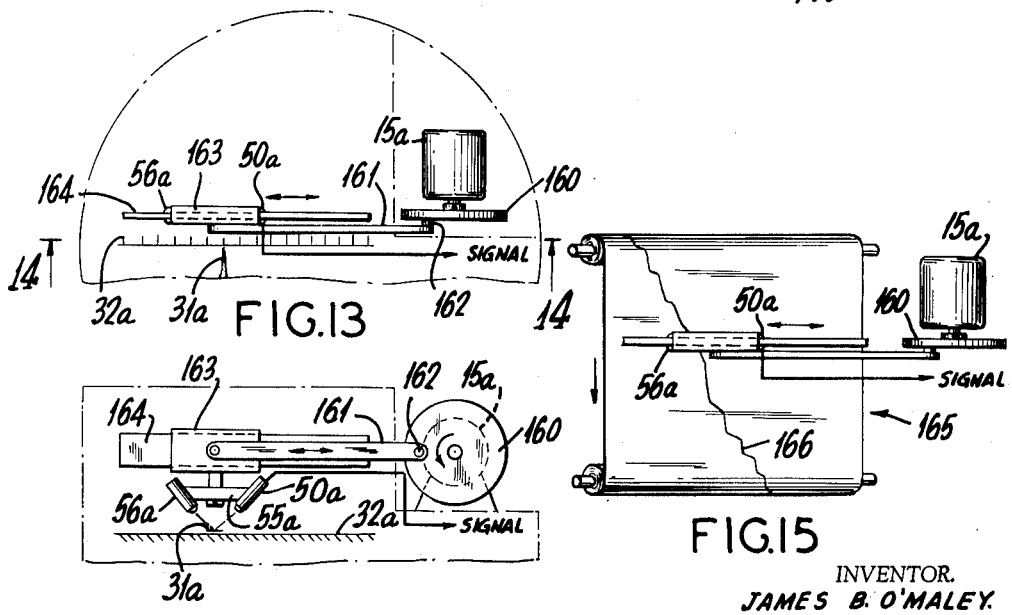
FIG.13
FIG.14
FIG.15
INVENTOR.
JAMES B. O'MALEY.
BY
Leonard H. King
ATTORNEY.

United States Patent Office 3,205,489
Patented Sept. 7, 1965

3,205,489
DIGITAL CONVERTER
James B. O'Maley, Fort Lauderdale, Fla., assignor, by mesne assignments, to Discon Corporation, Fort Lauderdale, Fla., a corporation of Florida
Filed July 17, 1961, Ser. No. 124,624
28 Claims. (Cl. 340—347)

This invention relates generally to an apparatus for reading a pointer type instrument and, in particular, to means for reading a pointer type instrument and providing a digital readout.

There are many pointer type instruments for which there are no counterparts in the form of direct digital transducers. A need has long existed for a device which can be attached to a pointer type instrument to convert it into a digital transducer. A pointer type instrument thus equipped can be made to perform any of the functions of a conventional digital transducer, such as providing data to a digital computer, control systems, card or tape punch, or registering readings in decimal form on a digital display or digital printer. In fact, the combination of the device of this invention with a pointer type instrument is often superior to a direct digital transducer where such a transducer is available. The device of this invention is particularly suited to remote indication or telemetering in that the pointer instrument reading can be transmitted by two telemetry channels or by a simple three-wire cable whereas the usual digital transducer requires relatively complex means to transmit binary or cyclic coded data. The digital converter of this invention may be employed to provide improved performance where a particular pointer instrument may have better qualities, e.g., accuracy, repeatability, reliability, etc., than existing digital transducers.

One embodiment of this invention provides means for comparing a pointer type instrument under calibration with a standard instrument to provide means for calibrating such instruments and avoid the human reading errors prevalent when conventional manual techniques are employed. In another aspect of the invention, it may be used to modify existing metering arrangements to provide for Go-No-Go, or High-Low-Go testing and if desired, for the simultaneous print-out of test data.

Thus, it is a primary object of this invention to provide a digital readout means for a pointer type instrument.

Another object of this invention is to provide a digital readout apparatus which may be attached to a standard pointer type instrument.

A different object of this invention is to provide a digital readout for a non-linear pointer instrument.

Still a further object of this invention is to provide an apparatus for comparing two pointer type instruments under test and providing a difference readout.

Still a further object of this invention is to provide a readout device for a pointer instrument having a timing scale.

Another object of this invention is to provide a rectilinear indicator readout device.

An object of this invention is to provide a device adapted to be employed in conjunction with a pointer type indicator for indicating whether the indicator under test falls within a predetermined tolerance.

Still other objects of this invention will, in part, become obvious and will, in part, be pointed out with particularity as the following description proceeds.

In the drawing:

FIG. 2 is an elevational view taken along line 2—2 of FIG. 1.

FIG. 3 is a block diagram showing the basic circuit elements employed in the device of the present invention.

FIG. 4 shows various voltage waveforms associated with the embodiment of FIG. 3.

Figure 7:
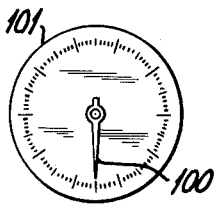
FIG. 7 is a sectional view taken along line 7—7 of FIG. 6.
Figure 8:
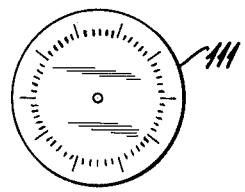
FIG. 8 is a sectional view taken along line 8—8 of FIG. 6.

FIGS. 10 and 11 correspond to the views of FIGS. 7 and 8, respectively, showing the arrangement for a non-linear instrument.

FIG. 12 is a block diagram showing the invention embodied in a device for comparing a pair of pointer instruments.

FIG. 13 is a plan view of a rectilinear version of the apparatus.

FIG. 14 is a view, in elevation, of the apparatus of FIG. 13 taken along lines 14—14 of FIG. 13.

FIG. 15 is a perspective showing of a rectilinear version of the apparatus employed in scanning a strip chart.

Figure 1:
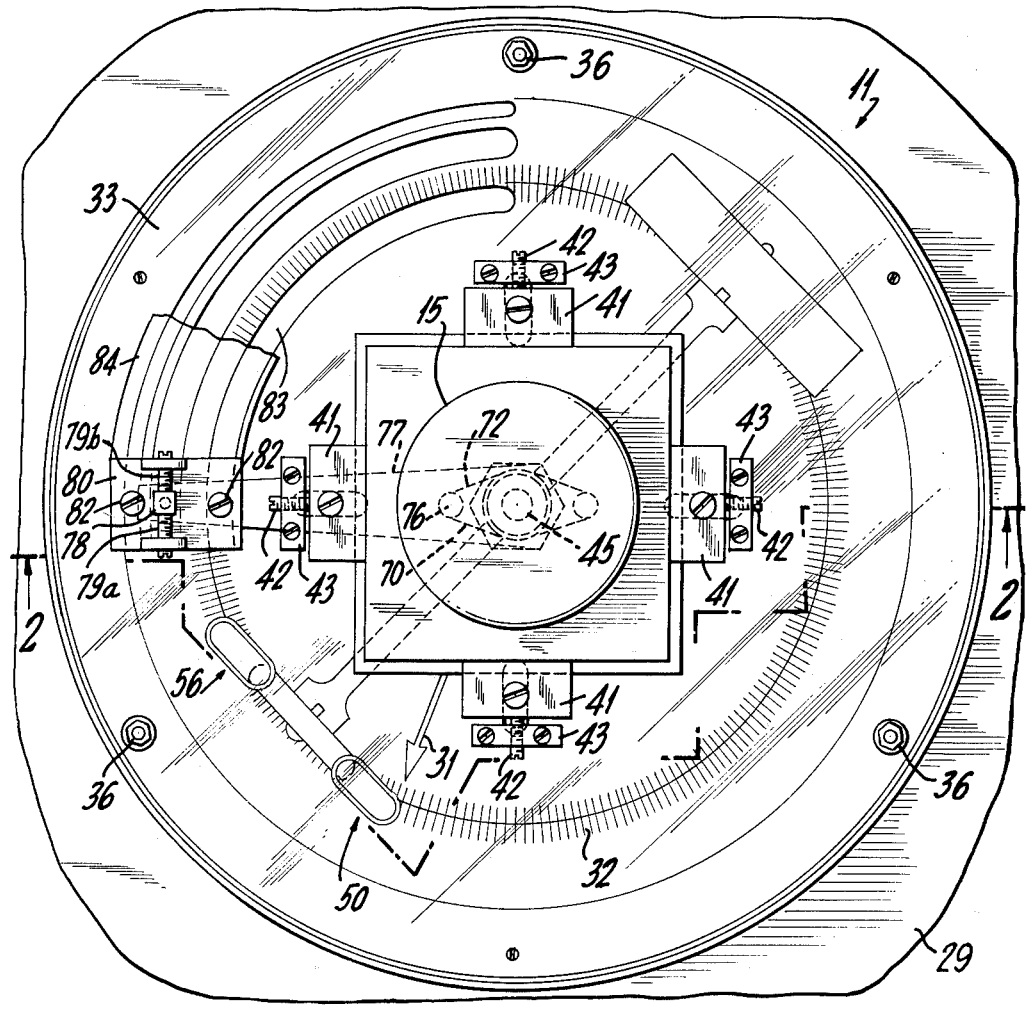
FIG. 1 is a plan view showing the converter of this invention attached to a pointer type instrument.

Referring now to FIGS. 1 and 2 wherein there is shown a conventional pointer instrument 30 mounted on a panel 29, the instrument 30 includes a pointer 31 and usually a scale or indicia 32. The conventional instrument window is not shown for purposes of clarity but it is not material whether or not such window is present in an actual installation. The apparatus includes a sensing head 11 which is clamped to the panel 29 in position above the pointer instrument 30 to be monitored. More specifically, a transparent face plate 33 is supported by annular member 34 in spaced relationship to panel 29 and is clamped thereto by bolts 36. A gasket 37 is interposed between the panel and the annular member 34.

Clamps 41 adjustably secure motor mounting block 40 against the face plate 33. In turn, the position of clamps 41 may be varied by means of adjusting screws 42 set in blocks 43. Blocks 43 are clamped to member 33 by conventional fastening means such as the screws shown. Adjusting screws 42 are so adjusted as to align shaft 45, of motor 15, axially with the center of rotation of the pointer.

It is preferred to employ a transparent face plate 33 so as to permit an observer to visually read the instrument 30. The face plate may be of a tinted transparent plastic or glass which acts as a filter and eliminates the effect of spurious signals which may result from direct sunlight. With a blue filter, a photocell is employed which is responsive only to light at the red end of the spectrum and is thus immune to sunlight passing through the blue face plate. If desired, a clear face plate with a colored filter layer may be employed.

A light source 50 is pivotally mounted on arm 55. The light source comprises a socket 51, bulb 52, housing 53, and lens 54, arranged to focus light from the lamp onto a desired plane. When the pointer and dial contrast is positive, i.e., a light colored pointer, against a black or dark dial, then the device is adjusted so that the image is formed at the plane of the pointer. When the pointer dial contrast is negative, i.e., dark pointer in combination with a light dial, then the device is adjusted so that the image is formed on the dial surface and the pointer is used to occult the light as the scanning means traverses the dial. In this case, the signal radius is chosen to provide a region free of dial engravings or numerals, etc. Also mounted on arm 55, there is provided a housing 56 which contains a photocell 57 and a lens 58 arranged to focus light reflected from instrument pointer 31 onto photocell 57. Leads 60, 60a, extend from the photocell through the hollow shaft 61 (shown in detail in FIG. 2a), to slip rings 62a, 62b. In like fashion, leads 63, 63a, are brought to slip rings 62c, 62d. Brushes 65a, 65b, etc., make contact to the respective slip rings 62a, 62b, 62c, 62d. In turn, connection is made to a suitable source of voltage to energize lamp bulb 52 and to make connection between the photocell and appropriate circuits, as will be discussed more fully hereinafter.

Figures 2A, 2B, 2C, 2D:
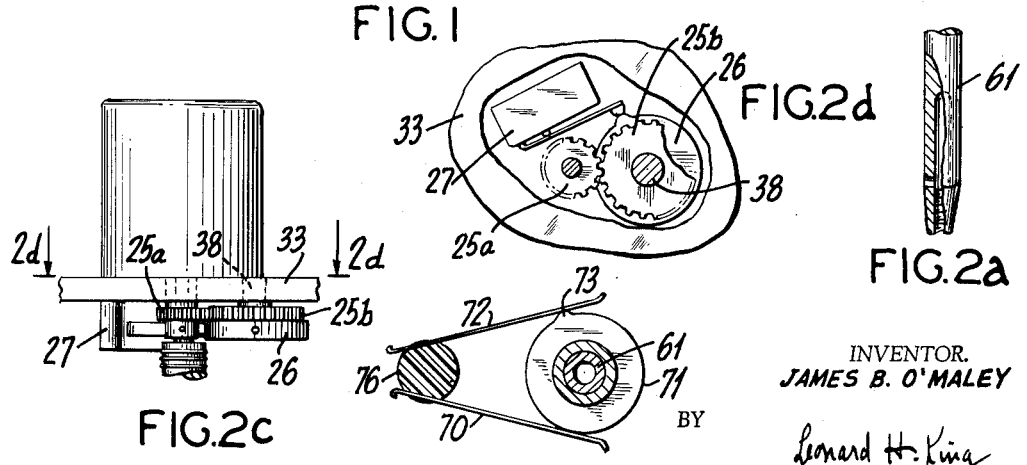
FIG. 2a is a perspective showing of a shaft member employed in the instrument.
FIG. 2b is a cross-section taken along line 2b—2b of FIG. 2 showing a starting pulse generating means.
FIG. 2c shows in elevation an alternative construction for providing a starting pulse.
FIG. 2d is a plan view taken along line 2d—2d of FIG. 2c.
Figure 5:
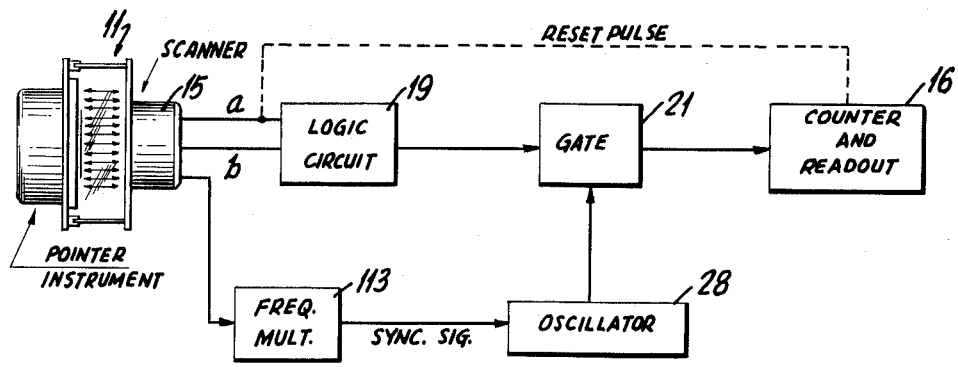
FIG. 5 is a block diagram of a high resolution embodiment of the invention.

Referring now to FIG. 2b, it will be noted that a wiper 70 makes contact to slip ring 71 and that wiper 72 is spaced away from slip ring 71 and is contacted momentarily by contact 73 once each revolution of the slip ring. The wipers 70 and 72 are carried by an insulator standoff 76, which is in turn mounted on radial arm 77; one end of radial arm 77 is arranged to pivot about shaft 61, the other end is secured to member 78. Member 78 is supported between adjusting screws 79a and 79b. In turn, the adjusting screws are carried by a block 80. It will be noted that block 80 is arranged to slide along the face plate 33. Bolts 82 pass through the slots 83 and are employed to clamp the block 80 at the appropriate position. Screws 79a, 79b serve as a fine adjustment means. A sliding protective cover 84 covers slots 83.

Referring now to FIG. 3 of the drawing, the converter device includes two basic units, (1) a scanner unit 11 or "sensing head" which attaches by means of adapters to the instruments to be read and (2) an electronic unit 12 which houses electronic circuitry. An electrical output having any of the standard codes is available for operation of a digital printer, card punch, or tape punch.

The scanner unit 11 translates the angular position of the instrument pointer 31 relative to a zero or reference position into a pulse time interval. The scanner uses a momentary contactor and a photoelectric pickoff to generate a pair of pulses, the interval between which is proportional to pointer displacement. The interval between the pulses is measured by conventional digital techniques and is registered on a digital display device 16. The pointer displacement is alternately sensed and registered on the display, the sensing time being approximately equal to the display time. The time interval between pulse pairs may be quantized (scaled) as desired for readout in units appropriate to the measurement involved. Scanning frequency may conveniently be as high as ten (10) scans per second. The scanner, being photoelectric in nature, imposes no mechanical load on the instrument pointer. The scanner, driven by a synchronous motor 15, operates the contactor 71 which is adjusted to coincide with the passage of the scanner unit over the instrument zero to produce a zero reference pulse which places the logic circuit in "start" condition. The logic circuit may be a conventional transistorized flip-flop circuit. The zero reference pulse is also employed to reset the display device 16. (See (a) of FIG. 4.) As the scanner unit passes the pointer, a second pulse is developed as shown at (b). Logic circuit 19 produces a gate control signal shown at (c), representing the interval between pulses. The frequency (d) of oscillator 20 is chosen in accordance with the resolution and full scale reading desired.

Divider 22 may be switched in or out of the circuit by double pole double throw switch 23a, 23b. The divider may be a flip-flop circuit or a conventional relay type divider. This limits reset to alternate scans.

Instead of the electrical divider, an alternative arrangement, shown in FIGS. 2c and 2d, may be employed. Here, gear 25a on the motor shaft drives gear 25b. The gears provide a 2:1 revolution ratio. Cam 26 coupled to gear 25b actuates microswitch 27. Gear 25b and cam 26 are supported by a fixed idler shaft 38. While not shown, it is to be understood that divider circuits may be employed with the other embodiments disclosed hereinafter.

Figure 6:
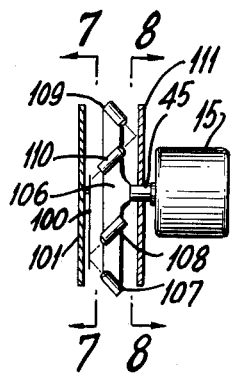
FIG. 6 shows, in elevation, a mechanical arrangement employed with the embodiment of FIG. 5.

Referring now to FIG. 6, there is shown an end view of a pointer 100 and instrument dial 101 in combination with a readout device of this invention. In this case, motor 15 drives shaft 45 which is affixed to supporting arm 106 having a first lamp 107 and photocell 108 and a second lamp 109 and a photocell 110. Lamp 107 is arranged to bounce light off pointer 100, and photocell 108 is arranged to receive the reflected light. On the other hand, lamp 109 and photocell 110 are focused on the indicia of scale 111. In this case, the output from photocell 108 of the scanner is fed to logic circuit 19, gate 21, and counter readout 16, as previously discussed in connection with the embodiment of FIG. 3. However, the signal obtained by photocell 110 is fed to a frequency multiplier 113 which provides a synchronizing signal to oscillator 28. For a linear instrument, the markings of the timing reference scale are uniformly spaced at a generator frequency which is an integral submultiple of the external oscillator. This timing signal is used to synchronize a higher frequency external oscillator 28. By this means, the readout resolution is not limited to that of the timing reference scale. Where resolution provided by the normal scale engravings or markings is adequate then the second scanner could be made to scan the actual non-linear scale markings and develop pulses corresponding to the scale markings. In this case, no oscillator would be needed. The physical arrangement of the pickoff units would be such as to prevent parallax error. The oscillator frequency is chosen in accordance with the desired full scale reading and a convenient submultiple is chosen for the timing reference. Typically, the oscillator may be operating at a frequency of 1000 cycles per second, the scan at 1 revolution per second and 100 divisions employed for the timing reference circular scale markings.

Figure 9:
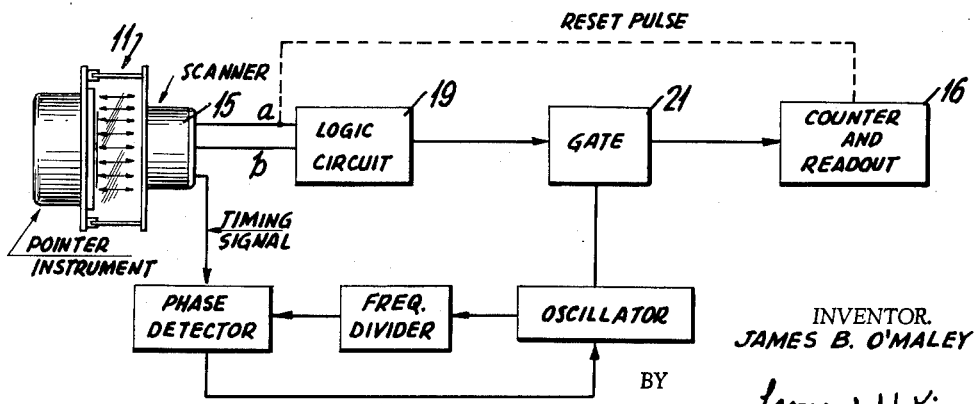
FIG. 9 is a block diagram of an instrument employing the apparatus of FIG. 6.

For a non-linear instrument, the spacing of the timing reference scale is made correspondingly non-linear. As shown in the block diagram of FIG. 9, the output of the oscillator is frequency divided to produce a signal of the same frequency as the timing reference signal. These signals are then phase detected to develop an error signal which, in turn, controls the frequency of the oscillator to maintain phase agreement. In this manner, the oscillator frequency is made to vary in accordance with the non-linearity introduced by the timing reference scale.

FIGS. 10 and 11 show the instrument scale and the timing scale, respectively, for a typical non-linear instrument.

A typical application for this device is shown in FIG. 12 where the device is arranged to compare two pressure gages. In this instance, a vacuum pump 130 and a pressure source 131 are connected through valves 132 and 133 to a manually controlled valve 134. Through the arrangement of valves 132, 133 and 134, either the vacuum pump or pressure source may be coupled to manifold 135 and then the same pressure or vacuum applied to master instrument 137 and the instrument under test 138.

A comparator scanner unit 140 comprising a motor 141 and having a scanner unit 142, 143 on each end is arranged to simultaneously scan both instruments.

The "a" and "b" signals are fed to respective logic circuits 19a, 19b. The signals from the logic circuits are compared by comparison circuit 144 and amplified in amplifier 144a and the error signal fed to indicator 145. In this case, the indicator is provided with a master device readout 146 as well as an error readout 147. If desired, a printing type readout device 148 may be employed.

Optionally, a Hi-Lo-Go limit selector and indicator 149 may be arranged to receive the error signal from the comparator and provide an indication as to whether the device under test does or does not have an accuracy within the preset tolerance. It is to be noted that the indicator 145, printer 148, and indicator 149 may all be employed or just one or two of the devices used.

Such limit selectors and indicators are widely used in industry apart from the apparatus of this invention. Such devices may be employed to automatically sound alarms or to take defective units out of an assembly line.

The gating and oscillator or other timing pulse circuit required for the operation of the counter and indicator 146 has been omitted from the showing of FIG. 12 for clarity as this equipment has been described in detail heretofore.

The foregoing description has been concerned with the reading of a rotating pointer. However, the invention is also applicable to the reading of a rectilinear scale. For example, in FIGS. 13 and 14, there is shown a photocell 56a and a source of illumination 50a carried by arm 55a. The photocell and light are focused on a pointer 31a arranged to move along scale 32a. Rectilinear motion may be provided by any of the well known mechanical arrangements of which a simple version is shown in the drawing solely for purposes of illustration. In this version, motor 15a rotates wheel 160 causing link 161 which is carried by pin 162 to oscillate back and forth moving slide 163 along support 164. The electronic circuits may be as described in connection with the rotational embodiments discussed earlier.

As shown in FIG. 15, the same arrangement may be used to scan a moving chart 165 having thereon marking 166. This provides means for obtaining a digital reading from a strip chart.

The term "reference line" as used in the claims refers to the instrument zero and need not be a physical line.

The term "index mark" is employed to generically encompass pointers, lines on charts, etc.

The term "datum" as used is intended to refer to a location from which the position of the pointer is to be indicated.

Minor variations will be obvious to those skilled in the art; for example, the reset signal can be obtained from the logic circuit without deviating from the spirit of the invention.

Having thus disclosed the best embodiment of the invention presently contemplated;

What is claimed is:

1. A device for use with a dial and pointer indicating instrument for converting the indication of that instrument into digital information, said device comprising a continually operating drive means, a photocell, means for mounting said photocell to be continually driven by said drive means to repeatedly traverse said dial and said pointer of said instrument, means for generating a first electrical signal when said photocell passes a datum index mark, means for causing a change in the light impinging on said photocell when said photocell passes said pointer to generate a second electrical signal, gating means responsive to said first electrical signal to open and responsive to said second electrical signal to close, clock means for generating timing signals, means for applying the timing signals from said clock means to said gating means to pass therethrough when said gating means is open, and means for indicating the number of timing signals passing through said gating means.

2. The device of claim 1 wherein said index mark rotates about an axis.

3. The device of claim 1 wherein said index mark moves along a rectilinear path.

4. The device of claim 1 wherein said index mark is a line on a chart.

5. The apparatus of claim 1 including a "go-no-go" limit selector.

6. The apparatus of claim 1 wherein said clock means comprises a timing scale provided with indicia and a second photocell arranged to move in synchronism with the first named photocell for detecting said indicia to provide said timing signals.

7. The apparatus of claim 6 wherein said indicia are uniformly spaced.

8. The apparatus of claim 6 wherein said indicia are non-uniformly spaced.

9. The apparatus of claim 6 including a frequency multiplier arranged to receive the output of said second photocell and provide a control signal of a higher frequency, an oscillator responsive to said control signal for providing timing signals to said means for indicating the number of timing signals.

10. The apparatus of claim 6 including a phase detector arranged to receive a timing pulse from said second photocell, said means for providing said timing signals comprising an oscillator providing a signal to said phase detector to coact with said timing signal to produce a frequency control signal controlling the frequency of operation of said oscillator.

11. The device of claim 1 including display means under control of said means for indicating the number of timing signals.

12. The device of claim 11 including means for periodically resetting said display means after more than one traverse of said photocell.

13. A position sensing apparatus for determining the angular position of a pointer mounted on a first rotatable shaft with respect to a reference line and for converting said position into digital information, said apparatus comprising a second shaft axially aligned with said first shaft, means for rotating said second shaft, a photocell arranged to rotate with said second shaft along an annular path which is concentric with the axis of said second shaft and in a plane parallel to the path of said pointer but spaced therefrom, a source of light arranged to provide illumination for said photocell, clock means for generating timing pulses, gating means connected to said clock means for passing timing pulses when open and blocking timing pulses when closed, means for generating a start signal and applying said start signal to said gating means to open said gating means when said photocell passes said reference line, means for modifying the light impinging on said photocell when said photocell passes said pointer to generate a stop signal and apply said stop signal to said gating means to close said gating means, means for counting the timing pulses passing through said gating means, and means associated with said counting means for indicating the number of counted pulses.

14. The device of claim 13 including display means under control of said counting means.

15. The device of claim 14 including means for periodically resetting said display means after more than one traverse of said photocell.

16. The apparatus of claim 13 including a "go-no-go" limit selector.

17. The apparatus of claim 13 wherein said clock means comprises a timing scale provided with indicia and a second photocell arranged to move in synchronism with the first named photocell for detecting said indicia to provide said timing pulses.

18. The apparatus of claim 17 wherein said indicia are uniformly spaced.

19. The apparatus of claim 17 wherein said indicia are non-uniformly spaced.

20. The apparatus of claim 17 including a frequency multiplier arranged to receive the output of said second photocell and provide a control signal of a higher frequency, an oscillator responsive to said control signal for providing timing signals to said counter means.

21. The apparatus of claim 17 including a phase detector arranged to receive a timing signal from said second photocell, said means for providing said timing pulses comprising an oscillator providing a signal to said phase detector to coact with said timing signal to produce a frequency control signal controlling the frequency of operation of said oscillator.

22. The apparatus of claim 13 including a transparent plate for supporting said second shaft and means to mount said plate proximate to said pointer.

23. The apparatus of claim 22 wherein said plate carries means for positioning said second shaft.

24. The apparatus of claim 13 wherein said means for providing a start signal is coupled to said second shaft.

25. Means for comparing the relative rotational positions of a pair of indicator pointers relative to a reference line of condition sensing means provided with first rotatable shafts equipped with said pointers comprising:

means for subjecting both said condition sensing means to the same condition;

means associated with each of said pointers for providing a pulse of a length indicative of the rotational position of the pointer, said means comprising a photocell arranged to rotate about an axis coaxial with the axis of said first rotatable shaft in a plane parallel to that of the pointer path, a source of light arranged to provide illumination for actuating said photocell, means for providing a start signal when said photocell traverses said reference line, means for generating a stop pulse whenever said photocell traverses a said pointer, and logic means under the joint control of said start and stop signals for providing said pulse of a length indicative of the position of its respective pointer;

a comparison circuit for comparing the pulse length of the output of each of the respective logic means; and means for indicating the difference in said pulse lengths.

26. The apparatus of claim 25 including means for simultaneously indicating the rotational position of one of said indicator pointers.

27. The apparatus of claim 26 wherein said position of one of said pointers and said difference is recorded.

28. Digital readout means for automatically indicating the deviation of an index mark with respect to a reference mark on a moving strip chart, comprising:

photocell means for repeatedly scanning said chart along successive paths transverse to the direction of chart movement;

means for generating a series of electrical timing pulses;

means for counting said timing pulses; and a gating circuit for controlling timing pulses transmitted to said counting means, said gating circuit being placed in a pulse transmit condition whenever said photocell passes said reference mark and into a pulse non-transmit condition whenever said photocell passes said index mark.

References Cited by the Examiner

UNITED STATES PATENTS

| | | | |
|---|---|---|---|
| 2,734,188 | 2/56 | Jacobs | 340—347 |
| 2,978,693 | 4/61 | Champion | 340—347 |
| 3,024,986 | 3/62 | Strianese et al. | 340—347 |
| 3,030,513 | 4/62 | Bayliss et al. | 340—347 |

MALCOLM A. MORRISON, *Primary Examiner.*

DARYL W. COOK, *Examiner.*